(12) United States Patent
Chen et al.

(10) Patent No.: US 8,934,902 B2
(45) Date of Patent: Jan. 13, 2015

(54) METHOD OF NOTIFYING SWITCHING INFORMATION AND BASE STATION

(75) Inventors: Zhongming Chen, Guangdong (CN); Yada Huang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/260,183

(22) PCT Filed: Mar. 21, 2011

(86) PCT No.: PCT/CN2011/072019
§ 371 (c)(1),
(2), (4) Date: Sep. 23, 2011

(87) PCT Pub. No.: WO2012/041044
PCT Pub. Date: Apr. 5, 2012

(65) Prior Publication Data
US 2013/0183970 A1    Jul. 18, 2013

(30) Foreign Application Priority Data
Sep. 28, 2010    (CN) .......................... 2010 1 0501341

(51) Int. Cl.
*H04W 36/00*    (2009.01)
*H04W 36/30*    (2009.01)
(52) U.S. Cl.
CPC .......... *H04W 36/30* (2013.01); *H04W 36/0061* (2013.01); *H04W 36/0083* (2013.01)
USPC ....................................... 455/436

(58) Field of Classification Search
USPC .................................... 455/436–448
See application file for complete search history.

(56) References Cited

U.S. PATENT DOCUMENTS

| | | | |
|---|---|---|---|
| 2002/0173275 A1* | 11/2002 | Coutant | 455/67.1 |
| 2009/0022107 A1* | 1/2009 | Kapoor et al. | 370/331 |
| 2009/0111473 A1 | 4/2009 | Tao et al. | |
| 2010/0022250 A1* | 1/2010 | Petrovic et al. | 455/450 |
| 2010/0074129 A1 | 3/2010 | Wang et al. | |
| 2010/0177654 A1* | 7/2010 | Charbit et al. | 370/252 |
| 2012/0014357 A1 | 1/2012 | Jung et al. | |

FOREIGN PATENT DOCUMENTS

| | | |
|---|---|---|
| CN | 101527943 A | 9/2009 |
| CN | 101588610 A | 11/2009 |
| EP | 2177042 A2 | 4/2010 |

OTHER PUBLICATIONS

International Search Report in PCT/CN2011/072019 mailed on Jul. 7, 2011 in 4 pages.

(Continued)

*Primary Examiner* — Joel Ajayi
(74) *Attorney, Agent, or Firm* — Knobbe, Martens, Olson & Bear, LLP (57) ABSTRACT

The present invention provides a method of notifying switching information and a base station. The method comprises: a source base station switching a user equipment (UE) to a target Pcell of a target base station; and the source base station notifying the target base station of signal quality of the target Pcell. The present invention ensures that the target base station can efficiently select secondary service cells according to the transmitted information, and reduces time delay.

11 Claims, 4 Drawing Sheets

(56) References Cited

OTHER PUBLICATIONS

Huawei "SCell list provided by source eNB" 3GPP TSG-RAN WG2 Meeting #71 in Madrid, Spain on Aug. 23-27, 2010 in 4 pages.
Motorola "Transfer of information at handover" 3GPP TSG-RAN WG2 #70bis in Stockholm, Sweden on Jun. 28-Jul. 2, 2010 in 4 pages.
NTT DOCOMO, INC. "New event trigger to assist Scell management" 3GPP TSG-RAN WG2 #71 in Madrid, Spain on Aug. 23-27, 2010 in 6 pages.
Rapporteur (SAMSUNG) "Introduction of carrier aggregation" 3GPP TSG-RAN WG2 Meeting #71 in Madrid, Spain on Aug. 23-27, 2010 in 71 pages.
Extended European Search Report for Application No. EP 11827940.5 dated Sep. 10, 2013 in 14 pages.

* cited by examiner

METHOD OF NOTIFYING SWITCHING INFORMATION AND BASE STATION

CROSS-REFERENCE TO RELATED APPLICATIONS

This application is the U.S. National Phase application under 35 U.S.C. §371 of International Application PCT/CN2011/072019, filed Mar. 21, 2011, which claims priority to Chinese Application 201010501341.9, filed Sep. 28, 2010.

FIELD OF THE INVENTION

The present application relates to the communication field, in particular to a method of notifying switching information and a base station.

BACKGROUND OF THE INVENTION

In the mobile communication system, in order to guarantee the service quality and provide excellent service experience for users, after user equipment (UE) establishes connection with the internet in a certain cell, the UE still needs to measure the signal qualities of the service cell and neighboring cells and select appropriate cell to perform the switching so that the mobility requirements can be met.

Figure 1:
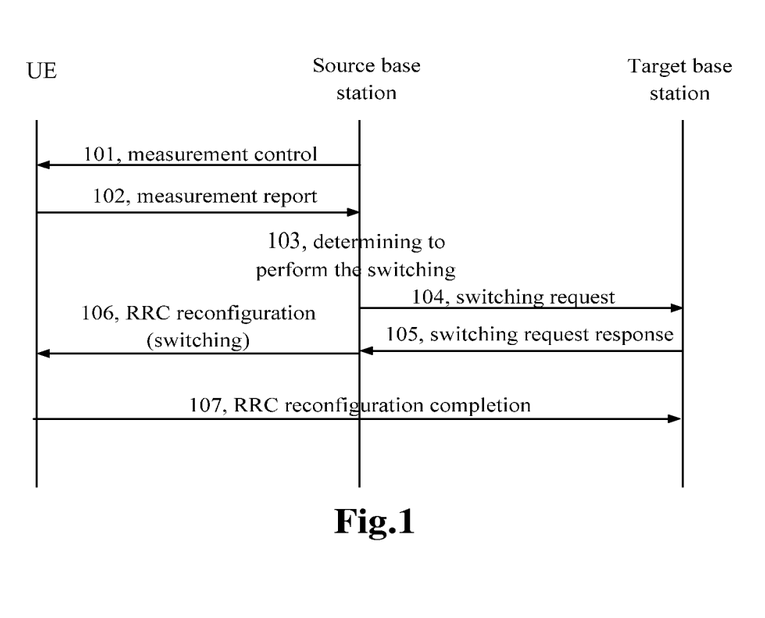
FIG. 1 is a schematic drawing of the switching process of X2 interface according to correlative technology.

FIG. 1 is a schematic drawing of the switching process of X2 interface according to correlative technology. As shown in FIG. 1, in the long term evolution (LTE) system, the switching process of the X2 interface comprises the steps as follows:

Step 101, the source base station sends a measurement control message to the UE in connecting state;

Step 102, the UE executes the measurement and submits the measurement report;

Step 103, the source base station determines to perform the switching and selects the target cell according to the received measurement report and in connection with practical situations;

Step 104, the source base station sends a switching request message to the target base station to which the target cell belongs, wherein the switching request message carries the capability information of the UE, the configuration information of an application server (AS) layer, radio resource management (RRM) configuration information, and context information;

Step 105, after performing resource reservation processing, the target base station responds a switching request response message to the resource base station, wherein the switching request response message carries the switching command information to the UE. The switching command information comprises the target cell information (the target cell can be different from the target cell in the switching request message);

Step 106, the source base station sends the switching command (namely RRC reconfiguration) to the UE;

Step 107, after completing the random access into the target cell, the UE sends a switching completion command to the target base station.

The switching process of S1 interface is similar to the switching process of the X2 interface except that the inter-communicating messages during the switching are forwarded by the MME.

The main basis that the source base station makes the switching decision is the measurement result. In the LTE system in connecting state, the specific measurement process is as follows: the network side sends the measurement control message to the UE, wherein the measurement control message carries measurement identification (MID), measurement object (MO), report configuration (RC) and the other measurement relative attributes. The measurement identification correlates the MO to the RC to form an entire measurement task. The MO comprises the attributes (e.g. carrier, neighboring cells list etc.) of the measurement object. Each carrier is configured with only one measurement object. The RC comprises the attributes (e.g. event activating or periodic reporting, definitions (A1, A2 . . . ) of the activated events, reporting times etc.) of the report configuration. The UE executes the measurement and evaluation according to the MO and RC in the measurement control message, generates a measurement report according to the measurement result, and submits the measurement report to the network side. The network side decides whether to perform the switching according to the measurement report submitted by the UE.

Figure 2:
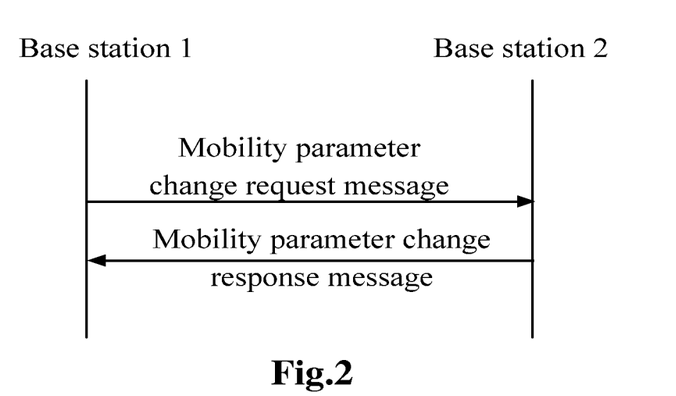
FIG. 2 is a schematic drawing of mobility parameters negotiation process according to correlative technology.

In the LTE, some key mobility parameters can be negotiated between the base stations (called as base station 1 and base station 2 hereafter). FIG. 2 is a schematic drawing of mobility parameters negotiation process according to correlative technology. The mobility parameters negotiation is realized through the steps as follows: the base station 1 sends a mobility parameter change request to the base station 2; if the base station 2 accepts the change, the base station 2 responds a mobility parameter change response to the base station 1.

Figure 3:
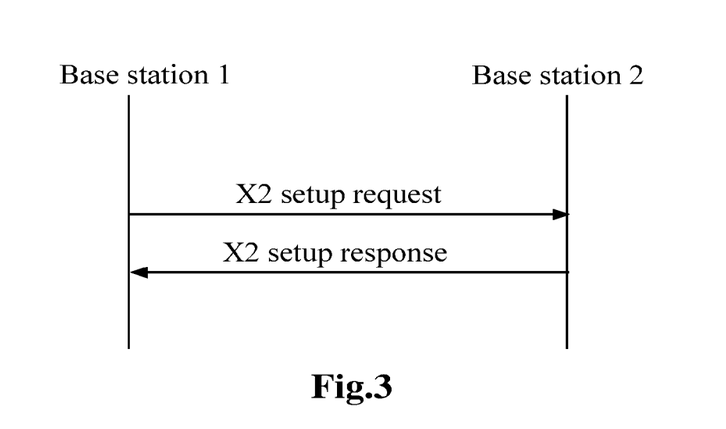
FIG. 3 is a schematic drawing of X2 interface setup process between the base stations according to correlative technology.

FIG. 3 is a schematic drawing of X2 interface setup process between the base stations according to correlative technology. As shown in FIG. 3, the base station sends an X2 setup request to the base station 2; and base station 2 responds an X2 setup response to the base station 1.

In order to provides higher data rate for mobile users, the long term evolution advance (LET-A) system puts forward a carrier aggregation (CA) technology, with the purpose to provide wider broad band for the UE with corresponding abilities and improve the peak rate of the UE. In the LTE, the maximum downlink transmission bandwidth supported by the system is 20 MHz. The CA refers to the technology which aggregates two or a plurality of component carriers (CC) to support the transmission bandwidths more than 20 MHz and not more than 100 MHz to the maximum. The LTE-A UE with the carrier aggregation ability can send and receive data in a plurality of component carriers. The UE mentioned hereafter refers to the LTE-A UE with the carrier aggregation ability except in exceptional circumstances. In the LTE-A system, after entering the connecting state, the UE can communicate with the source base station through a plurality of component carriers (e.g. CC1, CC2) at the same time. The base station will designate a primary component carrier (PCC) through explicit configuration or according to protocol agreement, and the other component carriers are called as secondary component carriers (SCC). The service cell on the DL PCC is called as primary cell (Pcell), and the service cell on the DL SCC is called as secondary cell (Scell).

The switching process in the LTE-A is the same with the switching process in the LTE. The source base station sends the measurement control message to the UE in connecting state; the UE executes the measurement and submits the measurement report; the source base station determines to perform the switching and selects the target Pcell according to the received measurement report and in connection with practical situations; the source base station sends the switching request message to the target base station to which the target Pcell belongs, wherein the switching request message carries the capability information of the UE, the configuration information of the AS layer, the RRM configuration information, and context information; after performing resource reservation processing, the target base station responds the switching request response message to the resource base station, wherein the switching request response message carries the switching command information to the UE; the switching command information comprises the target Pcell information (the target Pcell can be different from the target Pcell in the switching request message), and can also comprise one or a plurality of Scells; the UE receives the switching command (namely RRC reconfiguration) from the source base station; after completing the random access into the target Pcell, the UE sends the switching completion command to the target base station.

In order to cooperate with the target base station to configure one or a plurality of Scells, the switching request message sent to the target base station by the source base station also carries an optimum cell list, and the signal quality of the cells (e.g. reference signal received power (RSRP) and reference signal received quality (RSRQ)). The cells in the list are non-service cells which are sequenced in descending order according to wireless signal quality (that is to say, the optimum cell is sequenced at the foremost). Aiming at each frequency, the source base station selects at least one optimum cell from the available measurement report to form the optimum cell list. The target base station can configure the Scell for the UE according the list. As a matter of course, the configured Scell can be not the cells in the list.

As seen in the above-mentioned description, in correlative technologies, after completing the decision-making process of cell switching, the source base station transmits the signal quality of the backup Scells to the target base station through the optimum cell list which provides basis for the target base station to select Scells. However, in the present processing mode, the target base station can only acquire the signal quality of the backup Scells notified by the source base station, or the cells in the optimum cell list are comparatively unorganized, with the result that the judgment accuracy of the Scells is influenced and the processing complexity of the target base station is increased.

SUMMARY OF THE PRESENT INVENTION

The present invention mainly aims to provide a method of notifying switching information and a base station to at least solve the above-mentioned problems.

The present invention provides a method of notifying switching information according to one aspect of the present invention. The method comprises: a source base station switching a user equipment (UE) to a target Pcell of a target base station; and the source base station notifying the target base station of signal quality of the target Pcell.

Preferably, the step of the source base station notifying the target base station of signal quality of the target Pcell further includes: the source base station including the signal quality of the target Pcell in an optimum cell list, and sending the optimum cell list to the target base station; or the source base station including the signal quality of the target Pcell in a predefined information cell instead of the optimum cell list, and sending the predefined information cell to the target base station.

Preferably, the signal quality comprises the signal quality comprises at least one of reference signal received power (RSRP) and reference signal received quality (RSRQ).

Preferably, before the source base station notifies the target base station of the signal quality of the target Pcell, the method further comprises: the source base station negotiating with the target base station whether or not to transmit an optimum cell list, or, the source base station determining whether or not to transmit the optimum cell list based on whether or not the UE supports carrier aggregation or whether or not there is only one working cell of the UE; proceeding to next step if it determines to transmit the optimum cell list, and terminating the notification if it determines not to transmit the optimum cell list.

The present invention provides a method of notifying switching information according to another aspect of the present invention. The method comprises: a source base station arranging cells in an optimum cell list according to a predefined signal quality, wherein the predefined signal quality includes one of RSRP and RSRQ; and the source base station notifying a target base station of the optimum cell list.

Preferably, each cell in the optimum cell list meets a predefined condition, and the predefined condition includes: the predefined signal quality of a backup secondary cell (Scell)≥ (the predefined signal quality of a target Pcell identified by the source base station–a predefined offset).

Preferably, if the source base station identifies a plurality of target Pcells, the predefined condition includes: the predefined signal quality of the backup Scell≥(the predefined signal quality of a predefined target Pcell–a predefined offset), wherein the predefined target Pcell include one of the following: a target Pcell with an optimum predefined signal quality among the plurality of target Pcells, a target Pcell with a worst predefined signal quality among the plurality of target Pcells, and an arbitrary target Pcell of the plurality of target Pcells.

The configuration information of the optimum cell list is determined by a protocol, or is determined through a negotiation between the source base station and the target base station, wherein the configuration information includes at least one of the following: predefined offset, predefined signal quality, and a maximum number of cells in the optimum cell list.

Preferably, the step of the source base station negotiating the configuration information with the target base station further includes: one party of the source base station and the target base station including the configuration information of the one party in a setup request and sends the setup request to the other party of the source base station and the target base station during a setup process of an S1 interface or an X2 interface; and the other party returning a setup response that includes the configuration information of the other party.

Preferably, the step of the source base station negotiating the configuration information with the target base station further includes: one party of the source base station and the target base station notifying the configuration information to the other party of the source base station and the target base station through a mobility parameter change request message; and the other party returning a mobility parameter change response message including information which indicates agreement or not including any information if the other party agrees with the configuration information, or the other party returning a mobility parameter change failure message or a mobility parameter change response message including the configuration information of the other party if the other party disagrees with the configuration information.

Preferably, before the step of the source base station arranging the cells in the optimum cell list according to the predefined signal quality, the method further comprises: the source base station negotiating with the target base station whether or not to transmit an optimum cell list, or, the source base station determining whether or not to transmit the optimum cell list based on whether or not a UE currently switched supports carrier aggregation or whether or not there is only one working cell of the UE; proceeding to next step if it determines to transmit the optimum cell list; and terminating the notification if it determines not to transmit the optimum cell list.

Preferably, an optimum cell that does not have a measurement result of the predefined signal quality in a frequency is not added into the optimum cell list or is added at the end of the optimum cell list.

The present invention provides a base station according to another aspect of the present invention. The base station comprises: a switching determination module, configured to switch a user equipment to a target Pcell of a target base station; and a notification module, configured to notify the target base station of signal quality of the target Pcell.

The present invention provides a base station according to another aspect of the present invention. The base station comprises: a sorting module, configured to sort cells in an optimum cell list according to a predefined signal quality, wherein the predefined signal quality includes one of RSRP and RSRQ; and a notification module, configured to notify the target base station of the optimum cell list.

In virtue of the present invention, the source base station notifies the service quality of the target Pcell to the target base station, or notifies the target base station of the backup Scells which meet the predefined offset conditions. The present invention solves the problems in the current technologies that the Scell determination is inaccurate and the target base station has to deal with more complex issues due to the fact that the target base station receives less sufficient or organized switching information, ensures that the target side can effectively select the Scells according to the transmitted information, and reduces time delay.

BRIEF DESCRIPTION OF THE DRAWINGS

The drawings in the specification provide a further understanding to the present invention and constitute a part of the application. The exemplary embodiments of the present invention and the explanation thereof are given thereafter by way of illustration only, and thus are not limitative of the present invention, and wherein.

DETAILED DESCRIPTION

The present invention will be detailed hereinafter with reference to the drawings and in connection with the embodiments. What should be explained is that if un-conflictive, the embodiments of the present invention can be inter-combined with the characteristics in the embodiments.

Figure 4:
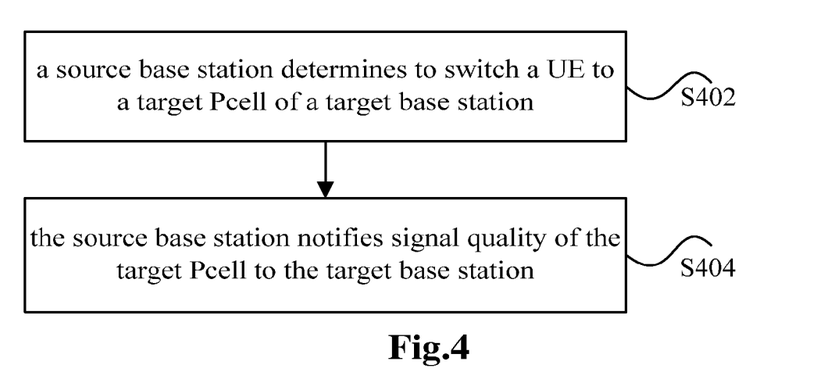
FIG. 4 is a flowchart of a method of notifying switching information according to the embodiment of the present invention.

The embodiment of the present invention provides a method of notifying switching information. FIG. 4 is a flowchart of a method of notifying switching information according to the embodiment of the present invention. As shown in FIG. 4, the method comprises:

Step S402, the source base station determines to switch the UE to the target Pcell of the target base station;

Step S404, the source base station notifies the target base station of the signal quality of the target Pcell.

Since the carriers with similar signal qualities have the best aggregation effect, the present invention puts forward the method to reduce the switching time delay. In the method, the source base station notifies the signal quality of the switched target Pcell to the target base station, so that the target base station can acquire the signal quality of the target Pcell. Thereby, through comparing the quality differences between the target Pcell and the backup Scell, the method can determine the final Scell, ensures that the differences of the signal qualities between the target Pcell and the backup Scell are within the predefined range, improves the accuracy to select the Scell, and reduces the switching time delay.

The step that the source base station notifies the signal quality of the target Pcell to the target base station can be executed by adopting one of the following modes:
(1) The source base station includes the signal quality of the target Pcell in the optimum cell list, and then sends the optimum cell list to the target base station;
(2) The source base station includes the signal quality of the target Pcell in a predefined information cell instead of the optimum cell list, and then sends the predefined information cell to the target base station.

Preferably, the signal quality reported as mentioned above can comprise at least one of RSRP and RSRQ.

What needs to be explained is that if there are several Pcells, the signal qualities of each Pcell can be transmitted.

Preferably, before the step that the source base station notifies the signal quality of the target Pcell to the target base station, the method also comprises: the source base station negotiates with the target base station whether or not to transmit an optimum cell list, or, the source base station determines whether or not to transmit the optimum cell list based on whether or not the UE currently switched supports carrier aggregation or whether or not there is only one working cell of the UE; proceeding to next step if it determines to transmit the optimum cell list, otherwise terminating the notification.

Under the circumstance that the optimum cell list is not transmitted, the target base station does not need to acquire the signal quality of the Pcell to determine proper Scell. Therefore, in virtue of the above-mentioned process, whether the signal quality of the target Pcell needs to be notified can be determined according to whether the optimum cell list is transmitted.

Figure 5:
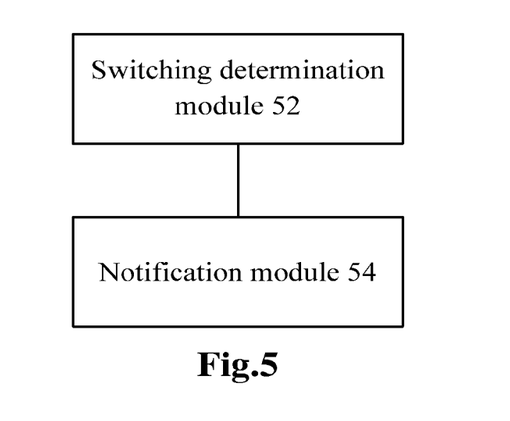
FIG. 5 is a structure diagram of a base station according to the embodiment of the present invention.

FIG. 5 is a structure diagram of a base station according to the embodiment of the present invention. The base station comprises: a switching determination module 52 configured to switch the UE to the target Pcell of the target base station; and a notification module 54 which is coupled with the switching determination module 52 and is configured to notify the signal quality of the target Pcell to the target base station.

The first embodiment which integrates the technical schemes of a plurality of preferable embodiments as mentioned above will be detailed hereafter by taking the switching scene of the X2 interface as an example. The switching scene of the S1 interface has the similar process, so unnecessary details will not be repeated here anymore.

Figure 6:
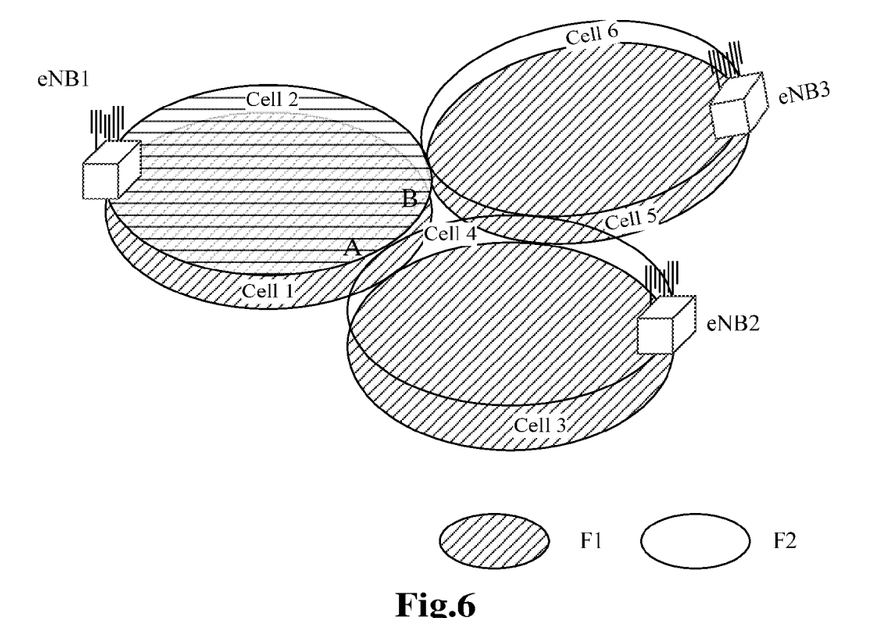
FIG. 6 is a schematic diagram of the switching scene according to the first and second embodiments.

As shown in FIG. 6, in the first place, through negotiation, the base station 1 and the base station 2 determine to carry the optimum cell list in a switching preparation command. The negotiation process initiated by the base station 1 is as follows (the negotiation process initiated by the base station 2 is similar, so unnecessary details will not be repeated here anymore): if the base station 1 needs to carry the optimum cell list in the switching preparation command sent to the base station 2, the base station 1 sends a newly added optimum cell list carrying request message to the base station 2. After the base station 2 receives the optimum cell list carrying request message, if the base station 2 agrees, the base station 2 returns a newly added optimum cell list carrying response message to the base station 1; and if the base station 2 disagrees, the base station 2 returns a newly added optimum cell list carrying refuse message to the base station 1. Or, the base station 1 carries the optimum cell list carrying request message in the X2 setup request message. After the base station 2 receives the optimum cell list carrying request message, if the base station 2 agrees, the base station 2 carries an optimum cell list carrying agreement message in the X2 setup response; and if the base station 2 disagrees, the base station 2 carries an optimum cell list carrying disagreement message in the X2 setup response. Or, the base station 1 carries the optimum cell list carrying request message in the mobility parameter change request message. After the base station 2 receives the optimum cell list carrying request message, if the base station 2 agrees, the base station 2 carries the optimum cell list carrying agreement message in the mobility parameter change response; and if the base station 2 disagrees, the base station 2 carries the optimum cell list carrying disagreement message in the mobility parameter change response or the mobility parameter change failure response. The negotiation processes of the other parameters between the base stations are similar to the above-mentioned process, so unnecessary details will not be repeated here anymore.

If the negotiation is performed through the S1 interface, then the S1 setup request message carries the newly added optimum cell list carrying request message; and the S1 setup response message carries the new added optimum cell list carrying response/refuse message. The process is the same with the process as mentioned above.

Or, the source base station determines whether to include the optimum cell list or not according to the ability of the current UE which needs to perform the switching. If the UE does not support the carrier aggregation, the optimum cell list will not be carried; or if the UE supports the carrier aggregation but uses only one cell, the optimum cell list will not be carried either.

The UE1 and UE2 configure the cell 1 on the F1 and the cell 2 on the F2 during the communication, wherein the cell 1 is a Pcell, and the cell 2 is a Scell. Furthermore, the base station allocates the following measurement task to the UE1 and UE2 through the RRC reconfiguration command:
MID=1, MO=F1, RC=A2;
MID=2, MO=F2, RC=A2;
MID=3, MO=F1, RC=A3, the predefined offset is 3 dB, and the RSRP and RSRQ are reported;
MID=4, MO=F2, RC=A6, the predefined offset is 0 dB, and the RSRP and RSRQ are reported;

The UE1 moves to the point A, and the UE reports the measurement report that MID=4. The reported cell list is as follows: Cell 4 (RSRP=47, −94 dbm, RSRQ=6, −17 db), carrying the signal quality of the Cell1 (RSRP=43, −98 dbm, RSRQ=4, −18 db), and the signal quality of the Cell2 (RSRP=40, −101 dbm, RSRQ=5, −17.5 db).

The UE also reports the measurement report that MID=3. The reported cell list is as follows: Cell 3 (RSRP=46, −95 dbm, RSRQ=12, −14 db), carrying the signal quality of the Cell1 (RSRP=41, −100 dbm, RSRQ=4, −18 db), and the signal quality of the Cell 2 (RSRP=39, −102 dbm, RSRQ=5, −17.5 db).

The base station determines to switch the UE1 to the Cell 4 on the F2 (that is to say, the Pcell is the Cell 4 on the F2) according to the above-mentioned measurement reports, sends the switching request message to the base station 2 to which the Cell 4 belongs, and carries the optimum cell list. The organizing modes of the optimum cell list are detailed as follows:

The first mode: the Cell 4 is the target Pcell selected by the source cell. According to the current switching flow, the cell notifies the target base station through the switching preparation command. The newly added optimum cell list does not carry the cell, so the optimum cell list comprises only the Cell 3, and the RSRP and/or RSRQ of the Cell 3. The target base station needs to configure the Scell which is similar to the target Pcell to perform the aggregation, so the source base station needs to notify the target base station of the signal quality of the target Pcell, namely the RSRP and/or RSRQ of the Cell 4. The detailed organizing mode is as shown in table 1:

TABLE 1

| Name of information cell | Value | |
| --- | --- | --- |
| Target Pcell | Cell 4 | NULL |
| RSRP of the target Pcell | 47, −94 dbm | NULL |
| RSRQ of the target Pcell | 6, −17 db | NULL |
| The optimum cell list | Cell 3 | RSRP of the Cell 3 is 46, −95 dbm |
| | | RSRQ of the Cell 3 is 12, −14 db |

The cell in the optimum cell list can be identified by adding a PCI (physical cell identity) on the carrier. Since each measurement task identifier is corresponding to one measurement object, the measurement task identifier actually also comprises the carrier information. Therefore, the cell in the optimum cell list can also be identified by adding the PCI on the measurement task identifier.

The second mode: the Cell 4 is the target Pcell selected by the source cell. According to the current switching flow, the cell notifies the target base station through the switching preparation command. Since the signal quality of the cell needs to be notified to the target base station, in order to simplify and put the signaling format in order, the newly added optimum cell list comprises the cell, so the optimum cell list comprises the Cell 3 and the Cell 4, and the RSRP and/or RSRQ of the Cell 3 and the Cell 4 (the embodiment adopts RSRP and RSRQ). The cells are sequenced according to the designated RSRP or RSRQ. In the embodiment, the cells are sequenced according to the RSRP. The detailed organizing mode is as shown in table 2:

TABLE 2

| Name of information cell | Value | |
| --- | --- | --- |
| Target Pcell | Cell 4 | NULL |
| The optimum cell list | Cell 4 | RSRP of the Cell 4 is 47, −94 dbm |
| | | RSRQ of the Cell 4 is 6, −17 db |
| | Cell 3 | RSRP of the Cell 3 is 46, −95 dbm |
| | | RSRQ of the Cell 3 is 12, −14 db |

What needs to be explained is that the above-mentioned method is also applicable for the source Pcell and the source Scell. The signal qualities of the source Pcell and the source Scell are carried in each measurement report. If the signal quality of the source Pcell is the optimum in the frequency point, the optimum cell which comprises the frequency point in the optimum cell list is the source Pcell. As a matter of course, in this situation, the source base station will not determine to perform the switching. And the reasons why the source base station once determines to perform the switching in this situation are the load and the like. If the signal quality of the source Scell is the optimum in the frequency point, the optimum cell which comprises the frequency point in the optimum cell list is the source Scell. In the embodiment, neither source Pcell nor the source Scell is the optimum in the frequency point, so the source Pcell and the source Scell will neither appear in the optimum cell list.

Figure 7:
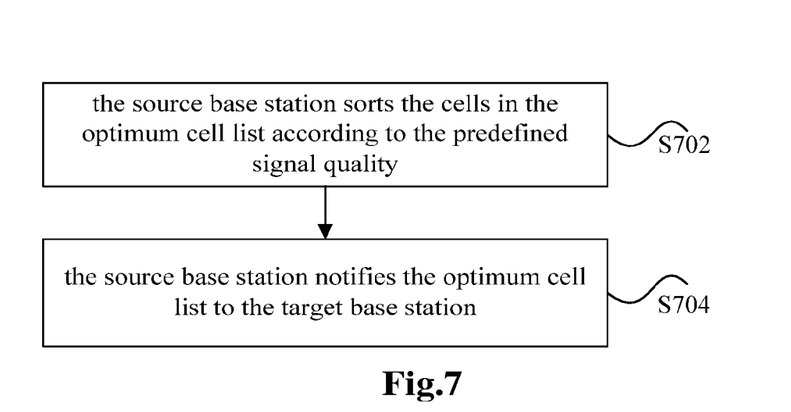
FIG. 7 is a flowchart of another notification method of the switching information according to the embodiment of the present invention.

The embodiment of the present invention also provides another notification method of the switching information. FIG. 7 is a flowchart of another notification method of the switching information according to the embodiment of the present invention. As shown in FIG. 7, the method comprises:

Step S702, the source base station arranges cells in an optimum cell list according to a predefined signal quality, wherein the predefined signal quality includes one of RSRP and RSRQ;

Step S704, the source base station notifies the target base station of the optimum cell list.

In virtue of the above-mentioned process, the optimum cell list obtained by the target base station has been sequenced, so that the target base station can conveniently select the Scell and the processing time that the target base station selects the Scell can be saved.

Since the carriers with similar signal qualities have the best aggregation effect, in order to reduce the switching time delay, the cells in the optimum cell list shall be in accordance with the following predefined conditions: the predefined signal quality of a backup secondary cell (Scell)≥(the predefined signal quality of a target Pcell identified by the source base station−a predefined offset). The method restricts that only when the signal quality of the backup Scell is higher than the remainder of subtracting the predefined offset from the signal quality of the backup Pcell, the backup Scell can be added in the cell list to transmit to the target side, so that the switching time delay is reduced.

If there are several backup Pcells, any one backup Pcell can be selected as reference. The optimum or the worst backup Pcell is selected as reference, or all the backup Pcells are selected as reference (that is to say, the backup Scell is added in the cell list if the signal quality of the backup Scell is higher than the remainder of subtracting the predefined offset from the signal quality of any one backup Pcell). That is to say, under the circumstance that the source base station determines a plurality of target Pcells, the predefined condition of the reference cell for comparison comprises: the predefined signal quality of the backup Scell≥(the predefined signal quality of a predefined target Pcell−a predefined offset), wherein the predefined target Pcell include one of the following: a target Pcell with an optimum predefined signal quality among the plurality of target Pcells, a target Pcell with a worst predefined signal quality among the plurality of target Pcells, and an arbitrary target Pcell of the plurality of target Pcells.

Preferably, the configuration information of the optimum cell list is determined by the protocol. In this way, all the base stations adopt the uniform configuration parameters, so that the configuration is convenient to realize and the negotiation process is saved. Or, the configuration information of the optimum cell list is determined through the negotiation between the source base station and the target base station, wherein the configuration information comprises at least one of the following: the predefined offset, the predefined signal quality, and the maximum quantity of the cells in the optimum cell list. The source base station can perform the configuration of the optimum cell list according to the configuration information. Through controlling the quantity of the cells in the optimum cell list, the signaling overhead can be decreased as much as possible.

Preferably, the negotiation process between the source base station and the target base station for the configuration information can adopt one of the following modes:

(1) one party of the source base station and the target base station including the configuration information of the one party in a setup request and sends the setup request to the other party of the source base station and the target base station during a setup process of an S1 interface or an X2 interface; and the other party returning a setup response that includes the configuration information of the other party.

(2) one party of the source base station and the target base station notifying the configuration information to the other party of the source base station and the target base station through a mobility parameter change request message; and the other party returning a mobility parameter change response message including information which indicates agreement or not including any information if the other party agrees with the configuration information, or the other party returning a mobility parameter change failure message or a mobility parameter change response message including the configuration information of the other party if the other party disagrees with the configuration information.

Preferably, before the source base station arranges the cells in the optimum cell list according to the predefined signal quality, the source base station negotiates with the target base station whether or not to transmit an optimum cell list, or, the source base station determines whether or not to transmit the optimum cell list based on whether or not the UE currently switched supports carrier aggregation or whether or not there is only one working cell of the UE; proceeding to next step if it determines to transmit the optimum cell list, otherwise terminating the notification.

Preferably, an optimum cell that does not have a measurement result of the predefined signal quality in a frequency is not added into the optimum cell list or is added at the end of the optimum cell list.

Preferably, the above-mentioned signal quality (e.g. the RSRP or RSRQ) for comparison can be determined through the negotiation between base stations, or can be designated by the protocol.

Figure 8:
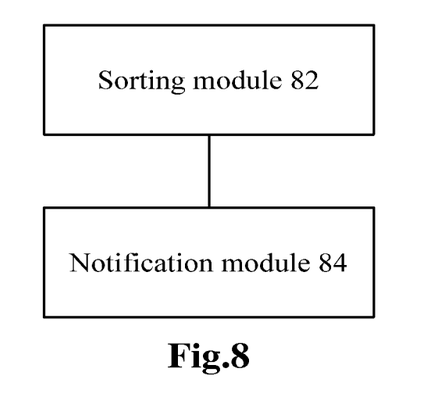
FIG. 8 is a structure diagram of another base station according to the embodiment of the present invention.

FIG. 8 is a structure diagram of another base station according to the embodiment of the present invention. As shown in FIG. 8, the base station comprises: a sorting module 82 which is configured to sort cells in an optimum cell list according to a predefined signal quality, wherein the predefined signal quality includes one of RSRP and RSRQ; and a notification module 84 which is configured to notify the target base station of the optimum cell list.

The second embodiment which integrates the technical schemes of a plurality of preferable embodiments as mentioned above will be detailed hereafter by taking the switching scene of the X2 interface as an example. The switching scene of the S1 interface has the similar process, so unnecessary details will not be repeated here anymore.

The Second Embodiment

In the first place, through negotiation, the base station 1 and the base station 3 determine to carry the optimum cell list in the switching preparation command. The negotiation process initiated by the base station 1 is as follows (the negotiation process initiated by the base station 3 is similar, so unnecessary details will not be repeated here anymore): if the base station 1 needs to carry the optimum cell list in the switching preparation command sent to the base station 3, the base station 1 sends the newly added optimum cell list carrying request message to the base station 3. After the base station 3 receives the optimum cell list carrying request message, if the base station 3 agrees, the base station 3 returns the newly added optimum cell list carrying response message to the base station 1; and if the base station 3 disagrees, the base station 3 returns the newly added optimum cell list carrying refuse message to the base station 1. Or, the base station 1 carries the optimum cell list carrying request message in the X2 setup request message. After the base station 3 receives the optimum cell list carrying request message, if the base station 3 agrees, the base station 3 carries the optimum cell list carrying agreement message in the X2 setup response; and if the base station 3 disagrees, the base station 3 carries the optimum cell list carrying disagreement message in the X2 setup response. Or, the base station 1 carries the optimum cell list carrying request message in the mobility parameter change request message. After the base station 3 receives the optimum cell list carrying request message, if the base station 3 agrees, the base station 3 carries the optimum cell list carrying agreement message in the mobility parameter change response; and if the base station 3 disagrees, the base station 3 carries the optimum cell list carrying disagreement message in the mobility parameter change response or the mobility parameter change failure response. The negotiation processes of the other parameters between the base stations are similar to the above-mentioned process, so unnecessary details will not be repeated here anymore.

If the negotiation is performed through the S1 interface, then the S1 setup request message carries the newly added optimum cell list carrying request message; and the S1 setup response message carries the new added optimum cell list carrying response/refuse message. The process is the same with the process as mentioned above.

Or, the source base station determines whether to carry the optimum cell list or not according to the ability of the current UE which needs to perform the switching. If the UE does not support the carrier aggregation, the optimum cell list will not be carried; or if the UE supports the carrier aggregation but uses only one cell, the optimum cell list will not be carried either.

Through negotiation, the base station 1 and the base station 3 determine that only when the signal quality of the backup Scell is higher than the remainder of subtracting 3 dB from the signal quality of the backup Pcell, can the backup Scell be added in the cell list to transmit to the target side. The above-mentioned 3 dB predefined offset can also be designated through the protocol. In addition, the optimum cell list that the base station 1 and the base station 3 determine to transmit through negotiation is sequenced according to the RSRP, and the values of the RSRP and RSRQ of each cell in the list are transmitted simultaneously. The order according to the RSRP can also be designated through the protocol.

In addition, the optimum cells are selected according to the signal quality for ordering. The cells in the list are sequenced according to the RSRP in the above-mentioned example, so the optimum cells are selected according to the RSRP. If the measurement result of the cell on a certain frequency only has the RSRQ and the RSRP is null, the frequency has no cells with the optimum RSRP. Therefore, the cells on the frequency are free from transmitting, or the optimum cells on the frequency are selected by the base station and listed in the end of the optimum cell list. The above-mentioned example also has the following measurement task:

MID=5, MO=F3, RC=A3, the predefined offset is 0 dB, and the RSRQ is reported.

In this case, F3 has no cells with the optimum RSRP. Therefore, the cells on F3 are free from transmitting, or the optimum cells on F3 are listed in the end of the optimum cell list.

The predefined offset and the signal quality for ordering can be different at each base station. For example, the predefined offset required by the base station 1 is 2 dB, and the signal quality for ordering is the RSRQ; the predefined offset required by the base station 3 is 3 dB, and the signal quality for ordering is the RSRP. The information can be transmitted to the other UE during setting up the X2 interface between the base station 1 and the base station 3. As shown in FIG. 3, when the base station 1 initiates the setup of the X2 interface, the base station carries the requirements of the base station 1 in the X2 setup request which is then transmitted to the base station 3; the base station 3 carries the requirements of the base station 3 in the X2 setup response (if the base station 3 does not have the X2 interface, the base station 3 can carry the requirements of the base station 3 in the S1 setup request and S1 setup response when the S1 interface is set up) which is then transmitted to the base station 1. Therefore, the optimum cell list in the switching preparation command sent by the base station 3 to the base station 1 is organized according to the situations that the predefined offset is 2 dB and the signal quality for ordering is RSRQ; and the optimum cell list in the switching preparation command sent by the base station 1 to the base station 3 is organized according to the situations that the predefined offset is 3 dB and the signal quality for ordering is RSRP. The notification processes of the other parameters between the base stations are similar to the above-mentioned process, so unnecessary details will not be repeated here anymore.

As shown in FIG. 6, the UE2 moves to the point B, and the UE reports the measurement report that MID=4. The reported cell list is as follows: Cell6 (RSRP=42, −99 dbm, RSRQ=8, −16 db), and Cell4 (RSRP=41, −100 dbm, RSRQ=5, −17.5 db), carrying the signal quality of the Cell1 (RSRP=43, −98 dbm, RSRQ=4, −18 db), and the signal quality of the Cell2 (RSRP=40, −101 dbm, RSRQ=5, −17.5 db).

The UE2 also reports the measurement report that MID=3. The reported cell list is as follows: Cell5 (RSRP=47, −94 dbm, RSRQ=10, −15 db), and Cell3 (RSRP=45, −96 dbm, RSRQ=8, −16 db), carrying the signal quality of the Cell1 (RSRP=41, −100 dbm, RSRQ=4, −18 db), and the signal quality of the Cell 2 (RSRP=39, −102 dbm, RSRQ=5, −17.5 db).

The base station determines to switch the UE2 to the Cell 5 on the F1 (that is to say, the Pcell is the Cell 5 on the F1) according to the above-mentioned measurement reports, sends the switching request message to the base station 3 to which the Cell 5 belongs, and carries the optimum cell list. The Cell 5 and the Cell 6 are sequenced according to the RSRP. The RSRP of the Cell 5 is −94 dbm, and the RSRP of the Cell 6 is −99 dbm. According to the first organizing mode, the optimum cell list is null; and according to the second organizing mode, the optimum cell list comprises the Cell 5.

In addition, in order to meet the demands of various operators, that is to say, when the base station 1 and the base station 3 belong to different operators, whether to transmit the optimum cell list and the measurement result or not can be restricted by the operators through negotiating the maximum number of the cells in the optimum cell list. For example, the base station sends the mobility parameter change request which carries the maximum number (e.g. three) of the cells to the base station 3. If the base station 3 agrees, the base station 3 responds the mobility parameter change response to the base station 1, wherein the mobility parameter change response does not carry any information or carries agreement information. The base station 1 and the base station 3 adopt the maximum number (which is three in the above-mentioned example) of the cells as the final result. If the base station 3 disagrees, the base station 3 responds the mobility parameter change response to the base station 1, wherein the mobility parameter change response carries the expected maximum number (e.g. two) of the cells. The base station 1 and the base station 3 adopt the minimum value (which is two in the above-mentioned example) of the two maximum numbers of the cells as the final result. As a matter of course, the number of the cells in the optimum cell list can also be designated through the protocol.

The number of the cells in the optimum cell list can be different at each base station. For example, the number of the cells in the optimum cell list required by the base station 1 is 2, and the number of the cells in the optimum cell list required by the base station 3 is 3. The information can be transmitted to the other UE during setting up the X2 interface between the base station 1 and the base station 3 (if the X2 interface does not exist, the information can be transmitted to the other UE during setting up the S1 interface). The optimum cell list in the switching preparation command send to the base station 1 by the base station 3 comprises two cells at the most, and the optimum cell list in the switching preparation command send to the base station 3 by the base station 1 comprises three cells at the most.

What needs to be explained is that the two notification methods of the switching information provided in the above-mentioned embodiments are two independent methods, and can be inter-combined. That is to say, not only is the signal quality of the target Pcell notified, but also the notified backup Scell is controlled to meet the predefined requirements. In this way, the selection accuracy of the Scell is improved and the switching time delay is reduced.

All in all, the scheme provided by the embodiments of the present invention specifies the detailed organizing method of the optimum cell list transmitted to the target base station by the source base station during the carrier aggregation switching process, ensures that the target side can effectively select secondary service cells according to the transmitted information, and reduces the time delay.

What needs to be explained is that the steps shown in the flowcharts of the attached drawings can be executed in a group of computers, such as a computer system capable of executing commands. Furthermore, although the flowcharts show the logic sequence of the steps, the steps shown or described in the flowcharts can be executed by the sequences different from the above-mentioned logic sequence.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the step of the present invention can be realized by using the executable program code of the calculating device. Consequently, the modules and the steps can be stored in the storage device and executed by the calculating device, or the modules and the steps are made into integrated circuit module respectively, or a plurality of modules or steps thereof are made into one integrated circuit module. In this way, the present invention is not restricted to any particular hardware and software combination.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all concluded in the protection scope of the present invention.

What is claimed is:

1. A method of notifying switching information, comprising:
    a source base station selecting one optimum cell at each frequency to form an optimum cell list and sequencing cells in the optimum cell list in descending order according to a predefined signal quality, wherein the predefined signal quality includes one of reference signal received power (RSRP) and reference signal received quality (RSRQ); and
    the source base station notifying a target base station of the optimum cell list.

2. The method according to claim 1, wherein each cell in the optimum cell list meets a predefined condition, and the predefined condition includes: the predefined signal quality of a backup secondary cell (Scell)≥(the predefined signal quality of a target Pcell identified by the Source base station−a predefined offset).

3. The method according to claim 2, wherein, if the source base station identifies a plurality of target Pcells, the predefined condition includes: the predefined signal quality of the backup Scell≥(the predefined signal quality of a predefined target Pcell−a predefined offset), wherein the predefined target Pcell include one of the following: a target Pcell with an optimum predefined signal quality among the plurality of target Pcells, a target Pcell with a worst predefined signal quality among the plurality of target Pcells, and an arbitrary target Pcell of the plurality of target Pcells.

4. The method according to claim 1, wherein configuration information of the optimum cell list is determined by a protocol, or is determined through a negotiation between the source base station and the target base station, wherein the configuration information includes at least one of the following: predefined offset, predefined signal quality, and a maximum number of cells in the optimum cell list.

5. The method according to claim 4, wherein the step of the source base station negotiating the configuration information with the target base station further includes:
    one party of the source base station and the target base station including the configuration information of the one party in a setup request and sends the setup request to the other party of the source base station and the target base station during a setup process of an S1 interface or an X2 interface; and
    the other party returning a setup response that includes the configuration information of the other party.

6. The method according to claim 4, wherein the step of the source base station negotiating the configuration information with the target base station further includes:
    one party of the source base station and the target base station notifying the configuration information to the other party of the source base station and the target base station through a mobility parameter change request message; and
    the other party returning a mobility parameter change response message including information which indicates agreement or not including any information if the other party agrees with the configuration information, or the other party returning a mobility parameter change failure message or a mobility parameter change response message including the configuration information of the other party if the other party disagrees with the configuration information.

7. The method according to claim 1, before the step of the source base station arranging the cells in the optimum cell list according to the predefined signal quality, the method further comprising:

the source base station negotiating with the target base station whether or not to transmit an optimum cell list, or, the source base station determining whether or not to transmit the optimum cell list based on whether or not a UE currently switched supports carrier aggregation or whether or not there is only one working cell of the UE;

proceeding to next step if it determines to transmit the optimum cell list; and terminating the notification fi it determines not to transmit the optimum cell list.

8. The method according to claim 1, wherein an optimum cell that does not have a measurement result of the predefined signal quality in a frequency is not added into the optimum cell list or is added at the end of the optimum cell list.

9. The method according to claim 2, wherein configuration information of the optimum cell list is determined by a protocol, or is determined through a negotiation between the source base station and the target base station, wherein the configuration information includes at least one of the following: predefined offset, predefined signal quality, and a maximum number of cells in the optimum cell list.

10. The method according to claim 9, wherein the step of the source base station negotiating the configuration information with the target base station further includes:

one party of the source base station and the target base station including the configuration information of the one party in a setup request and sends the setup request to the other party of the source base station and the target base station during a setup process of an S1 interface or an X2 interface; and the other party returning a setup response that includes the configuration information of the other party.

11. The method according to claim 9, wherein the step of the source base station negotiating the configuration information with the target base station further includes:

one party of the source base station and the target base station notifying the configuration information to the other party of the source base station and the target base station through a mobility parameter change request message; and the other party returning a mobility parameter change response message including information which indicates agreement or not including any information if the other party agrees with the configuration information, or the other party returning a mobility parameter change failure message or a mobility parameter change response message including the configuration information of the other party if the other party disagrees with the configuration information.

\* \* \* \* \*